ALFRED E. CZERKAS
ROGER B. KENYON
INVENTORS

ATTORNEYS

United States Patent Office 3,663,683
Patented May 16, 1972

3,663,683
POLYESTER HEAT RELAX PROCESSES
Alfred E. Czerkas and Roger B. Kenyon, Rochester, N.Y.,
assignors to Eastman Kodak Company, Rochester, N.Y.
Filed July 9, 1969, Ser. No. 840,252
Int. Cl. B29c 25/00; B29d 7/22, 7/24
U.S. Cl. 264—346                                    4 Claims

ABSTRACT OF THE DISCLOSURE

It has been discovered that oriented, heat-set, poly-(ethylene terephthalate) films can be heat relaxed at extremely high temperatures (i.e., 300–350° F.), provided (a) that the exposure of the film to such temperatures is for a very short period of time, and (b) that the film is supported at closely spaced intervals (i.e., at most about 15 inches) during the exposure thereof to such extremely high temperatures.

---

Figure 1:
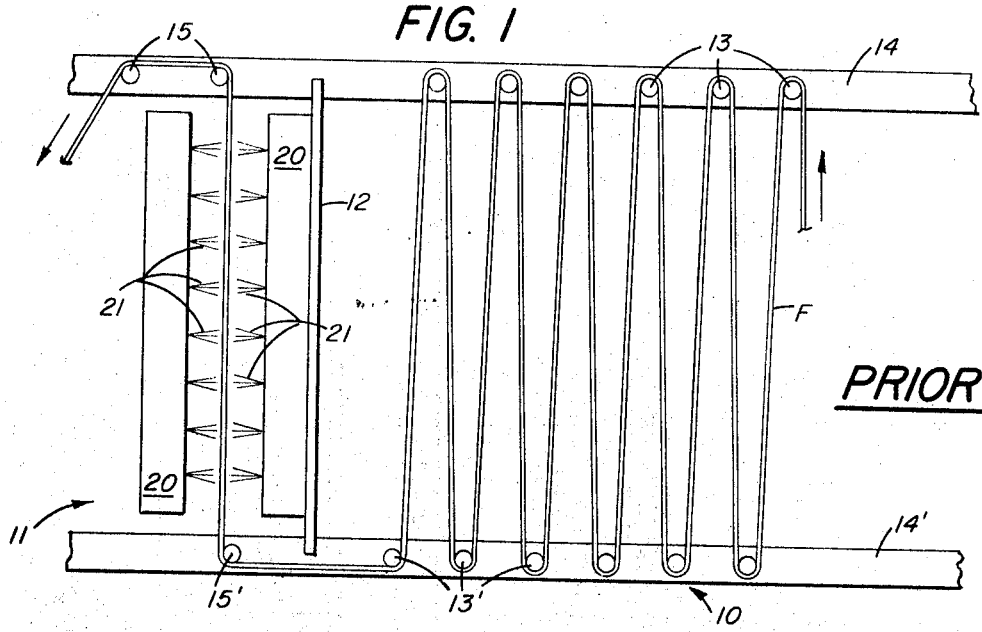

The present invention relates to the processing of poly(ethylene terephthalate) film to improve its planarity and to significantly shorten the time required to manufacture oriented, heat set, heat relaxed poly(ethylene terephthalate) films.

Films that can be directionally oriented and heat set such as poly(ethylene terephthalate) are also conventionally subjected to a special heat treatment (subsequent to the "heat set" treatment), known in the art as a "heat relax" treatment or step. This subsequent, special "heat relax" treatment differentiated from a "heat set" treatment by the fact that, while considerable tension is applied to the film during the "heat set" operation (such that the dimensions of the film are held substantially constant during the "heat set" treatment), the film is maintained under only a slight tension during the subsequent "heat relax" step (see, for example, details in U.S. Pat. 2,779,684). The use of a "heat relax" step in such overall continuous processes results in a still further improvement in the dimensional stability of the finished film.

This subsequent heat treatment (i.e., subsequent to the "heat set" operation) is also conventionally followed immediately by a cooling treatment, whereby the film is moved through a cooling section in order to fairly quickly lower its temperature to below the second order transition temperature of the film, so that the film is then in a condition suitable for further handling, including the winding of it onto rolls. Thus, in the continuous preparation of dimensionally stable, oriented, heat relaxed poly(ethylene terephthalate) film there is (1) a "heat relaxing" step (involving heating the film under, at most, only slight tension at a temperature slightly above the softening temperature of the film to improve its dimensional stability) and (2) a subsequent cooling step (whereby the temperature of the film is lowered to below its softening temperature fairly quickly).

These two steps are carried out in enclosed, usually adjacent, sections of conventional film machines. The sections will herein be termed, respectively, the "heat relax section" (or "heat relax air section") and the "cooling section" (or "cooling air section") in the order in which the film is passed through these sections during its manufacture.

In conventional processes, in which the design is limited by practical considerations, the "heat relax section" occupies a large portion of the total machine space because it has been found necessary to expose the film at temperatures of up to about 280° F. for a fairly long period of time in order to obtain the desired degree of heat relax. For example, in one conventional process, the film requires about 3½ minutes to pass through the "heat relax section." Thus, the film traverses a total of about 350 feet during its passage through the "heat relax section." Heretofore, it was believed not possible to utilize temperatures of 300° F. or higher in the "heat relax section" of polyester processes, because each time the temperature is raised to 300° F. or above in a conventional "heat relax section," the resulting film is found to have excessive creases, longitudional streaks, bagginess, or excessive amounts of shrinkage and a general lack of planarity. Thus, based upon actual experience, it was heretofore believed impossible to heat relax poly(ethylene terephthalate) at temperatures much higher than about 290° F.

It has now been discovered that, not only "heat relax" temperatures of 300° F. and above (up to about 350° F.) be used, but also such use results in at least three unexpected and valuable benefits: (a) the processing time can be substantially reduced thereby, (b) improved planarity in the film product can result from such use and (c) the "heat relax" step can be more easily controlled. However, it should be noted that the use of such very high heat relax temperatures cannot involve simply increasing the temperature in conventional "heat relax sections." What must be utilized is a combination of three interacting essential processing elements, in order to successful practice this invention. These essential processing elements are:

(1) Extremely short "heat relax sections" must be used (to thereby shorten the film's time of exposure to the very hot atmosphere in the "heat relax section");

(2) The film must be physically supported to a much greater degree than was heretofore believed necessary. Thus, there must be no long, unsupported span of film during the high temperature heat relax step, usually less than 15 inches, and (3) The temperature of the atmosphere in the "heat relax section" must be maintained within the range of from about 300° C. to about 350° F.

[Such very high temperatures were heretofer believed not pratical for use in the "heat relax section" because in this temperature region films of poly(ethylene terephthalate) soften to a considerably greater degree than they do at temperatures below 300° F.]

Figure 2:
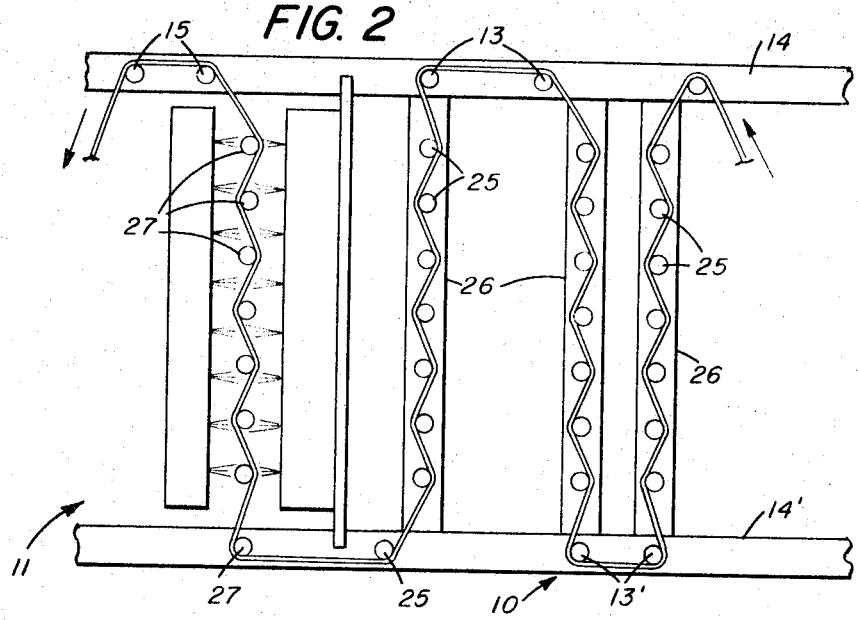

The novel features that we consider characteristic of our invention are set forth with particularity in the appended claims. The invention itself, however, both as to its organization and to its method of operation, together with additional objects and advantages thereof will best be understood from the following description when read in connection with the accompanying drawings in which:

FIG. 1 is a schematic view showing a conventional prior art film path used in the final heat relax and cooling sections of a polyester film making machine, and FIG. 2 is a schematic view similar to FIG. 1 and showing the film path modified according to one of the preferred embodiments of the present invention.

Briefly stated, the processes of the present invention are accomplished by supporting the film during its traversal through the extremely hot (300° F.–350° F.) heat relax section in such a way that there is no unsupported span of film which is over about 15 inches in length.

Preferably the unsupported film span should be at most about 10 inches. The supports for the film, which may take the form of idler rolls, and the like, extend transversely entirely across the width of the film.

Referring now to the drawings, in FIG. 1 there is schematically shown a conventional prior art roll arrangement for supporting a polyester film F as it is transported through the final heat treatment air section 10 and into the suceeding cooling air section 11, the two sections being separated by a partition 12. It should be understood that the film F before entering these last two treating sections 10 and 11 may have been oriented longitudinally, laterally, or both, before or after having been coated with a suitable substrate and heat treated one or more times to improve the dimensional stability of the film, dry the applied substrata, etc. by any suitable means well known in the art, and not shown. While not illustrated for reasons of simplicity, each of the heat treatment air section 10 and the cooling air section 11 is suitably enclosed so that the desired temperature conditions can be maintained therein upon being obtained by suitable means, not shown. In the heat relax air section 10 the entering film F is guided and supported in an undulating path by a series of upper idler rolls 13 and lower idler rolls 13'. The idler rolls 13 and 13' extend completely across the film path to engage the full width of the film and are rotatably supported at opposite ends in pairs of upper and lower support bars 14 and 14', respectively, extending along opposite sides of the section.

Upon leaving the heat relax section 10 the film passes under partition 12 and over idler roller 15' where it is redirected vertically upward through the cooling air section 11 and over upper guide rolls 15. As the film moves upwardly upon entering the cooling air section 11, it passes between two air plenums 20 which are provided along their length with openings, not shown, through which streams of cool air issue and impinge upon the full width of the film as indicated at 21. In this prior art arrangement, the upper and lower idler or guide rolls in both the heat relax and cooling sections have been spaced apart by 6 feet to 8 feet so that the unsupported film spans in these sections have been 6 to 8 feet in length.

In the manufacture of poly(ethylene terephthalate) films, for example, temperature to which the film is subjected in the heat treatment section 10 may range from about 150° F. to about 290° F. depending upon the type of treatment the film has received prior to reaching this final heat treatment stage.

In the practice of the present invention, the prior art film making machine shown in FIG. 1 can be modified as shown in FIG. 2 where corresponding parts are identified by the same reference characteristics. It will be noted that according to the present invention the film is passed back and forth around a series of closely spaced idler rolls during its passage through the heat relax section (where temperatures of 300° F.–350° F. are maintained). Optionally, the closely spaced idler rolls can also be continued in at least the beginning of the cooling section. As shown in FIG. 2, the film is passed back and forth over a plurality of closely spaced idler rolls 25 vertically spaced in "ladder" fashion along one or more supports 26. In this optional method of cooling, the film in cooling section 11 is passed upwardly back and forth over a series of closely spaced idler rolls 27. It is preferred that the lowermost guide roll 25 in the heat section and the lowermost guide roll 27 in the cooling section should be so spaced with the idler rolls, so that the unsupported span between any of them is at most about 10 inches, also.

While a "ladder" arrangement of idler rolls have been specifically disclosed for minimizing the unsupported spans when carrying out this invention, other means of supporting the film to the same end may be used.

The temperatures maintained in the heating section 10 during the practice of the present invention may vary from about 300° F. to about 350° F. depending somewhat upon the treatment which the film has received prior to passing through the heat relax section, and upon the speed with which the film traverses the heat relax section. Also, the length of the film path in the heat relax section 10 must be sufficiently short to permit passage of the film through the heat relax section in at most about 10 seconds (generally quicker when preferred temperatures of from about 320 to about 350° F. are used). The actual maximum length of the film path through the heating section will, of course, depend largely upon the rate of film travel through the machine. Thus, when speeds of 120 feet per minute are used, for example, the maximum film path should be only about 20 feet in the zone where exposure to atmospheres at temperatures of 300° F. or more takes place. It should be noted that conventional heat relax temperatures can be used in combination with those of the present invention, if desired. However, no particularly great advantage can be visualized in doing so. If such a combination is utilized, it must be remembered that the critical times described above relate solely to the time the film is passed through that portion of the heat relax section in which atmospheric temperatures of from about 300° F. to about 350° F. are maintained.

Although we have shown and described certain specific embodiments of our invention, we are fully aware that many modifications thereof are possible. Our invention therefore is not to be limited to the precise details of construction shown and described but is intended to cover all modifications coming within the scope of the appended claims.

What is claimed is:

1. In a process for manufacturing oriented, heat stabilized, thermoplastic poly(ethylene terephthalate) film, which process comprises, in a heat relaxing step, passing oriented, heat stabilized, unrelaxed poly(ethylene terephthalate) film under only slight tension through a heated section in which the temperature of said film is maintained above its second order transition temperature to thereby at least partially heat relax said oriented film; the improvement which comprises (a) maintaining the temperature of the hot atmosphere in said heated section between about 300° F. and about 350° F., (b) passing said film through said heated section at a speed sufficient to cause said film to be in contact with said hot atmosphere for at most about 10 seconds, and (c) passing said film in said heated section around a plurality of closely spaced rolls, the unsupported film spans between said closely spaced rolls being at most about 15 inches.

2. An improved process as in claim 1, wherein the unsupported film spans between said closely spaced rolls is at most about 10 inches.

3. An improved process as in claim 2, wherein said temperature of said hot atmosphere is between about 320° F. and about 340° F.

4. An improved process as in claim 3, wherein said film is contacted with said hot atmosphere for at most about 5 seconds.

References Cited

UNITED STATES PATENTS

| 2,627,088 | 2/1953 | Alles et al. | 264—289 |
| 3,068,525 | 12/1962 | Linton, Jr., et al. | 264—342 |
| 3,427,376 | 2/1969 | Dempsey | 264—288 |
| 3,526,695 | 9/1970 | Spencer | 264—346 |
| 3,544,676 | 12/1970 | Spencer | 264—346 |

FOREIGN PATENTS

| 601,554 | 7/1960 | Canada | 264—342 |

ROBERT F. WHITE, Primary Examiner

J. R. THURLOW, Assistant Examiner

U.S. Cl. X.R.

264—210, 289